United States Patent
Sasaki et al.

(10) Patent No.: US 7,148,170 B2
(45) Date of Patent: Dec. 12, 2006

(54) RECYCLED CERAMIC SLURRY, RECYCLED CERAMIC POWDER, CERAMIC ELECTRONIC PART, AND FABRICATING METHODS THEREFOR

(75) Inventors: Nobuhiro Sasaki, Nakamuroda Haruna-Machi (JP); Sadayoshi Kato, Tokyo (JP); Kunihiro Matsushita, Tokyo (JP); Makoto Miyashiro, Tokyo (JP); Hitoshi Kikuchi, Tokyo (JP); Tadashi Itoi, Tokyo (JP)

(73) Assignee: Taiyo Yuden Co., Ltd. (JP)

( * ) Notice: Subject to any disclaimer, the term of this patent is extended or adjusted under 35 U.S.C. 154(b) by 60 days.

(21) Appl. No.: 10/200,121

(22) Filed: Jul. 23, 2002

(65) Prior Publication Data

US 2003/0017933 A1    Jan. 23, 2003

(30) Foreign Application Priority Data

Jul. 23, 2001 (JP) .............................. 2001-221302

(51) Int. Cl.
C04B 35/622 (2006.01)
(52) U.S. Cl. .................. 501/155; 264/37.1; 264/37.13; 264/37.18; 264/650
(58) Field of Classification Search ................ 501/155; 264/37.1, 37.13, 37.18, 650, 658, 915; 588/10
See application file for complete search history.

(56) References Cited

U.S. PATENT DOCUMENTS 3,631,131 A * 12/1971 Kopko ....................... 521/40.5
3,941,604 A * 3/1976 Boyce ......................... 501/144
4,657,754 A * 4/1987 Bauer et al. ................. 423/625
5,051,219 A * 9/1991 Miller ........................ 264/40.7
5,279,994 A * 1/1994 Kerkar ........................ 501/94
5,302,368 A * 4/1994 Harato et al. ............... 423/625
5,587,010 A * 12/1996 Shibasaki et al. ....... 106/287.17
5,679,292 A * 10/1997 Nisimura .................... 501/119
6,146,560 A * 11/2000 Behi et al. .................. 264/37.4
6,440,187 B1* 8/2002 Kasai et al. .................. 51/309

FOREIGN PATENT DOCUMENTS

| DE | 19722035 | * 12/1998 |
| FR | 2092845 | * 1/1972 |
| JP | 56005315 | * 1/1981 |
| SU | 1130524 | * 12/1984 |

* cited by examiner

Primary Examiner—Paul Marcantoni
(74) Attorney, Agent, or Firm—Bacon & Thomas, PLLC

(57) ABSTRACT

Recycled ceramic slurry is produced by a method including the steps: dissolving the waste material of unfired ceramic in a solvent to form a waste solution; and adjusting a composition of the waste solution to thereby produce the recycled ceramic slurry. If the waste material of unfired ceramic includes a metal component, the metal component may be removed therefrom before the step of adjusting the composition of the waste solution.

12 Claims, 14 Drawing Sheets

RECYCLED CERAMIC SLURRY, RECYCLED CERAMIC POWDER, CERAMIC ELECTRONIC PART, AND FABRICATING METHODS THEREFOR

FIELD OF THE INVENTION

The present invention relates to recycled ceramic slurry, recycled ceramic powder, a ceramic electronic part, and fabricating methods therefor.

BACKGROUND OF THE INVENTION

Known as a ceramic electronic part, a laminated ceramic capacitor is generally classified into a simultaneous firing type and a non-simultaneous firing type.

The simultaneous firing type is usually fabricated by the following method steps: coating ceramic slurry on a stripe-shaped film to form a green sheet; printing a conductive paste on the green sheet to form a first conductive layer used for an internal electrode pattern; boring the green sheet at an interval of a unit scale; laminating the bored green sheet together with others and then attaching them by applying pressure thereto so as to form a laminated sheet; slitting the laminated sheet into a multiplicity of unfired chips by means of a dicer or a slicer; removing a binder from each of the unfired chips; applying a conductive paste on each of the unfired chips to form a second conductive layer used for an external electrode; simultaneously firing each of the unfired chips and the first and the second conductive layer; and forming at least one plated layer on the external electrode.

In case of the non-simultaneous firing type, the steps of the method are partially changed from those of the simultaneous firing type case. That is to say, after the binder is removed from each of the unfired chips, the unfired chips are fired together with the first conductive layer. Then, the conductive paste is applied on each of the chips fired so as to form the second conductive layer, which is subsequently fired to form the external electrode.

During the above-explained process for fabricating the laminated ceramic capacitor, various failures may occur to thereby produce waste materials of unfired ceramic, or scraps. For example, thickness errors, density errors, residual corrugations, and pin holes may occur in the step of forming the green sheet, thereby ending up to produce a useless green sheet, i.e., a waste material of unfired ceramic. The step of boring the green sheet coherently produces the waste materials of unfired ceramic. Further errors, such as lamination errors or attachment errors, may occur in the step of laminating and attaching the green sheets, thereby producing a useless laminated sheet, i.e., another type waste material of unfired ceramic. In addition, the laminated sheet may be erroneously slit to make a useless unfired chip, i.e., still another type waste material of unfired ceramic. After the slitting step, sludge or the like may be produced also as another type waste material of unfired ceramic.

The above-explained process or a similar one may be adapted for producing various ceramic electronic parts, besides the laminated ceramic capacitor. Regardless of what the ceramic electronic part is, however, the waste material of unfired ceramic may be produced during the process.

Traditionally, the responsibility for an adequate disposal of the waste material of unfired ceramic has been taken by the manufacturer of the unfired ceramic electronic parts. The disposal cost of the waste material of unfired ceramic, however, becomes very high because a recent rise in the demand for the ceramic electronic parts tremendously increases the amount of the waste material of unfired ceramic. Such a high disposal cost increases the fabrication cost. Therefore, a development of an efficient recycling method for the waste material of unfired ceramic can help to reduce the fabrication cost of the ceramic electronic part as well as the disposal cost of the waste material of unfired ceramic.

SUMMARY OF THE INVENTION

It is, therefore, an object of the present invention to provide recycled ceramic slurry, recycled ceramic powder, a ceramic electronic part, and fabricating methods therefor, which contribute to reduction in a fabrication cost of a ceramic electronic part as well as a disposal cost of the waste material of unfired ceramic.

In accordance with a preferred embodiment of the present invention, there is provided a method for manufacturing recycled ceramic slurry, the method including the steps of: dissolving the waste material of unfired ceramic in a solvent to form a waste solution; and adjusting the composition of the waste solution to thereby produce the recycled ceramic slurry.

In accordance with another preferred embodiment of the present invention, there is provided a method for manufacturing recycled ceramic powder, the method including the steps of: removing a binder from the waste material of unfired ceramic to provide a component adjusted material; and granulating the component adjusted material to produce the recycled ceramic powder.

In a still another preferred embodiment of the present invention provides a method for fabricating a ceramic electronic part, the method including the step of forming a green sheet by using ceramic slurry obtained by recycling the waste material of unfired ceramic.

Still another preferred embodiment of the present invention provides a method for fabricating a ceramic electronic part, the method including the steps of: forming ceramic slurry by using recycled ceramic powder obtained by recycling the waste material of unfired ceramic; and forming a green sheet by using the recycled ceramic slurry.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Figure 1:
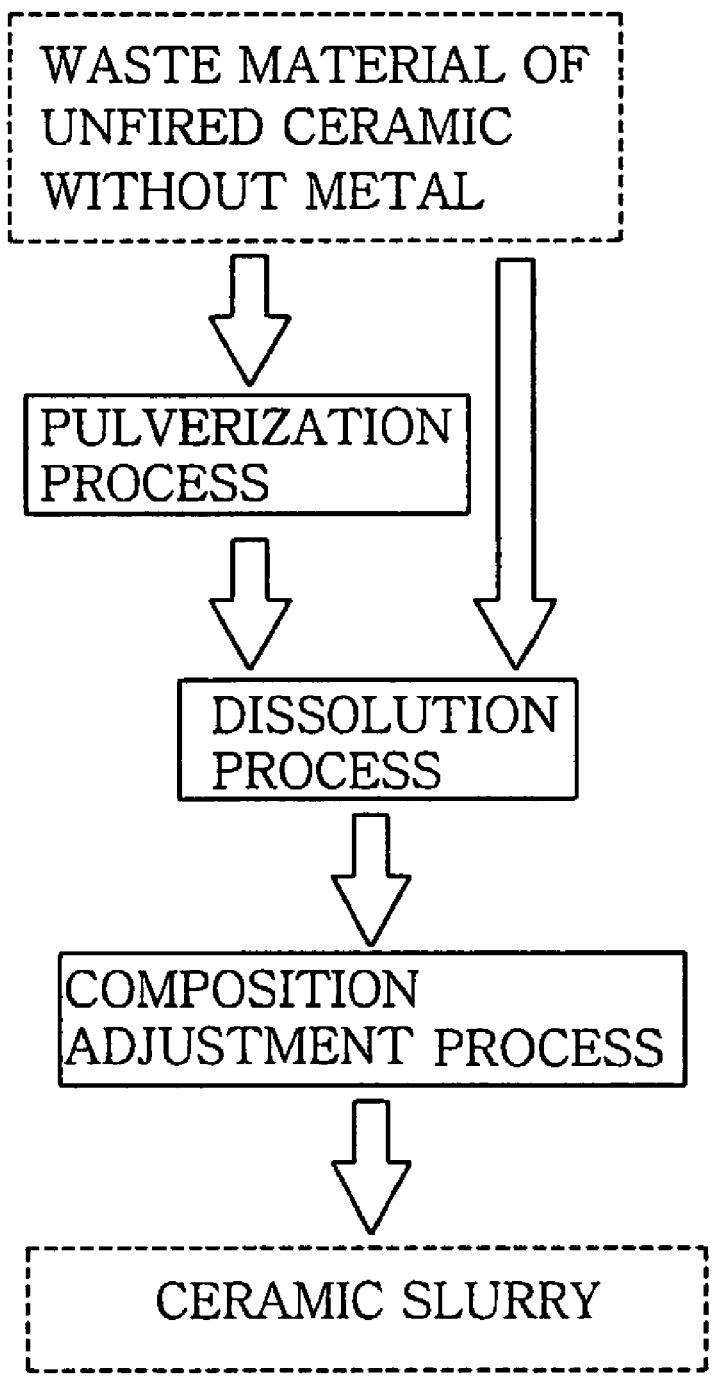
FIG. 1 shows a flow diagram of a first inventive method of producing recycled ceramic slurry from the waste material of unfired ceramic having no metal.

Referring now to FIGS. 1 to 10, various methods for recycling the waste material of unfired ceramic in accordance with preferred embodiments of the present invention will be described in detail. Like numerals represent like parts in the drawings.

In a process of fabricating a ceramic electronic part, various failures may occur to thereby produce the waste materials of unfired ceramic, or scraps. For example, thickness errors, density errors, residual corrugations, and pin holes may occur in the step of forming the green sheet, thereby making a useless green sheet, i.e., the waste material of unfired ceramic. The step of boring the green sheet usually produces the waste materials of unfired ceramic. Further errors, such as lamination errors or attachment errors, may occur in the step of laminating and attaching the green sheets, thereby making a useless laminated sheet, i.e., another type waste material of unfired ceramic. In addition, the laminated sheet may be erroneously slit to make a useless unfired chip, i.e., still another type waste material of unfired ceramic. After the slitting step, sludge or the like may be produced also as another waste material of unfired ceramic.

The waste material of unfired ceramic may include metal, i.e., a conductive layer used as an internal electrode and an external electrode or fragments thereof. Regardless of whether the metal is present therein or not, however, a major component of the waste material of unfired ceramic is obtained as a recycled material.

Figure 2:
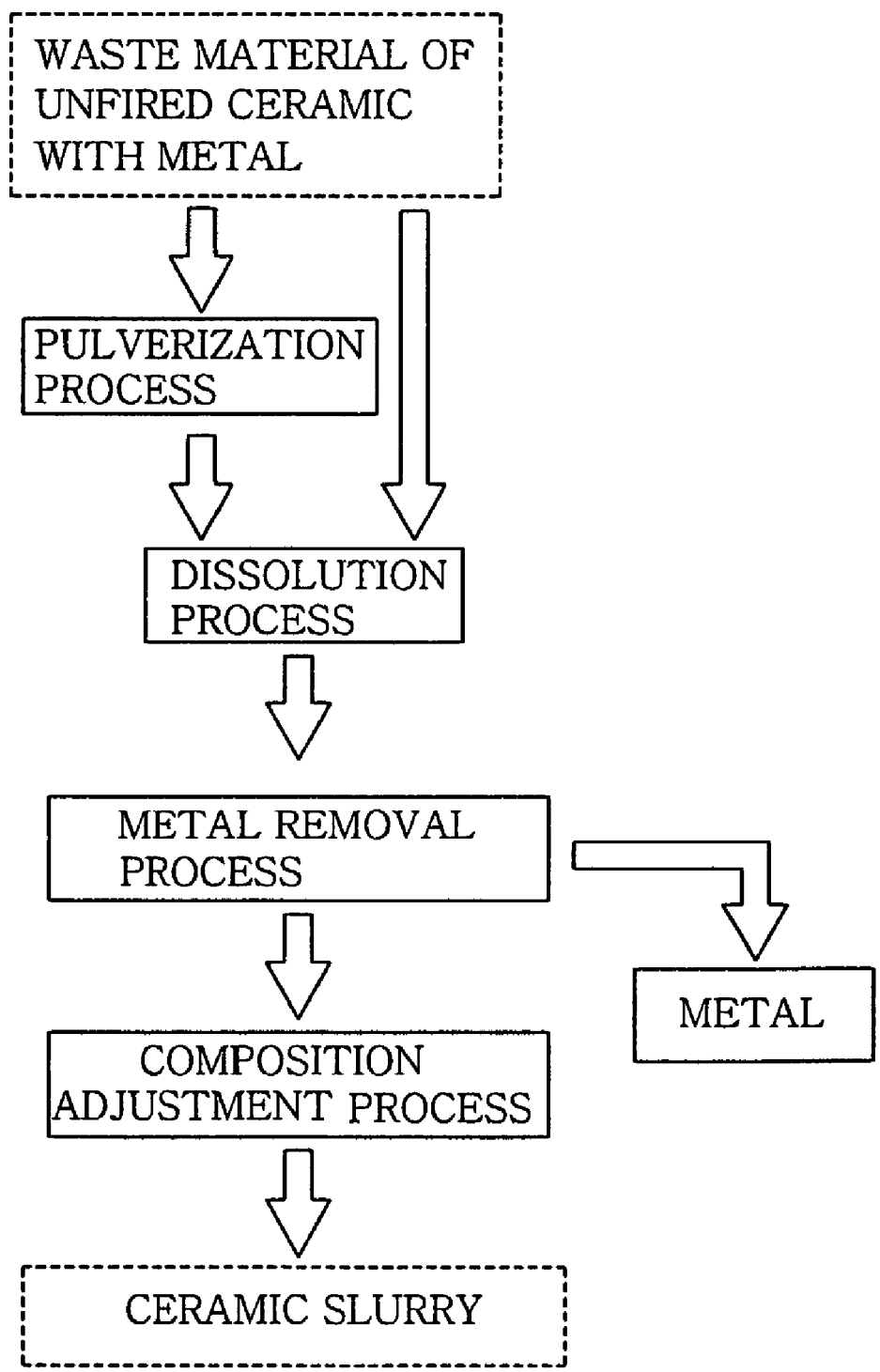
FIG. 2 depicts a flow diagram of a second inventive method of producing recycled ceramic slurry from the waste material of unfired ceramic having metal.
Figure 3A:
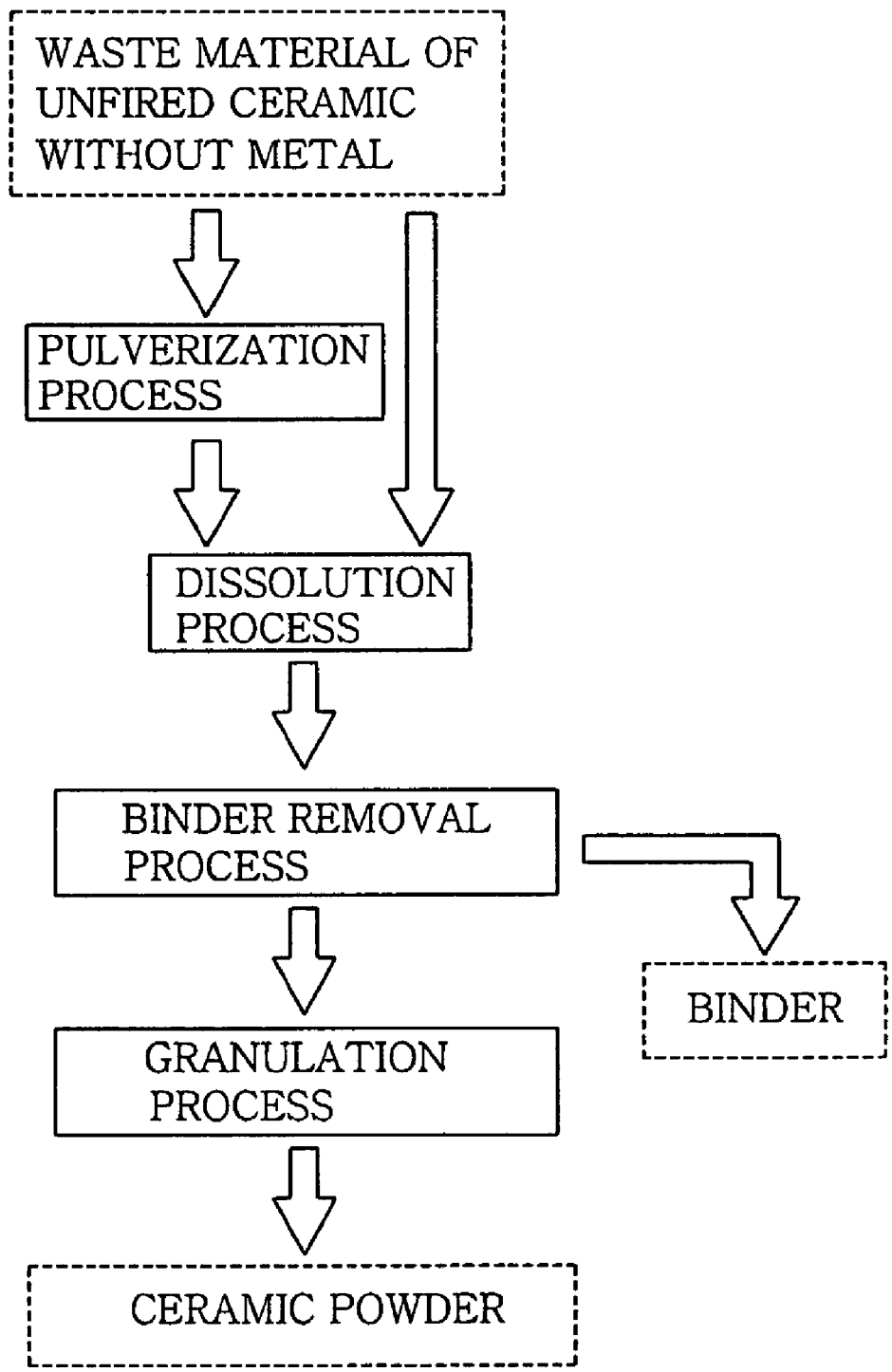
FIGS. 3A and 3B respectively provide flow diagrams of a third and a fourth inventive method of producing recycled ceramic powder from the waste material of unfired ceramic having no metal.
Figure 3B:
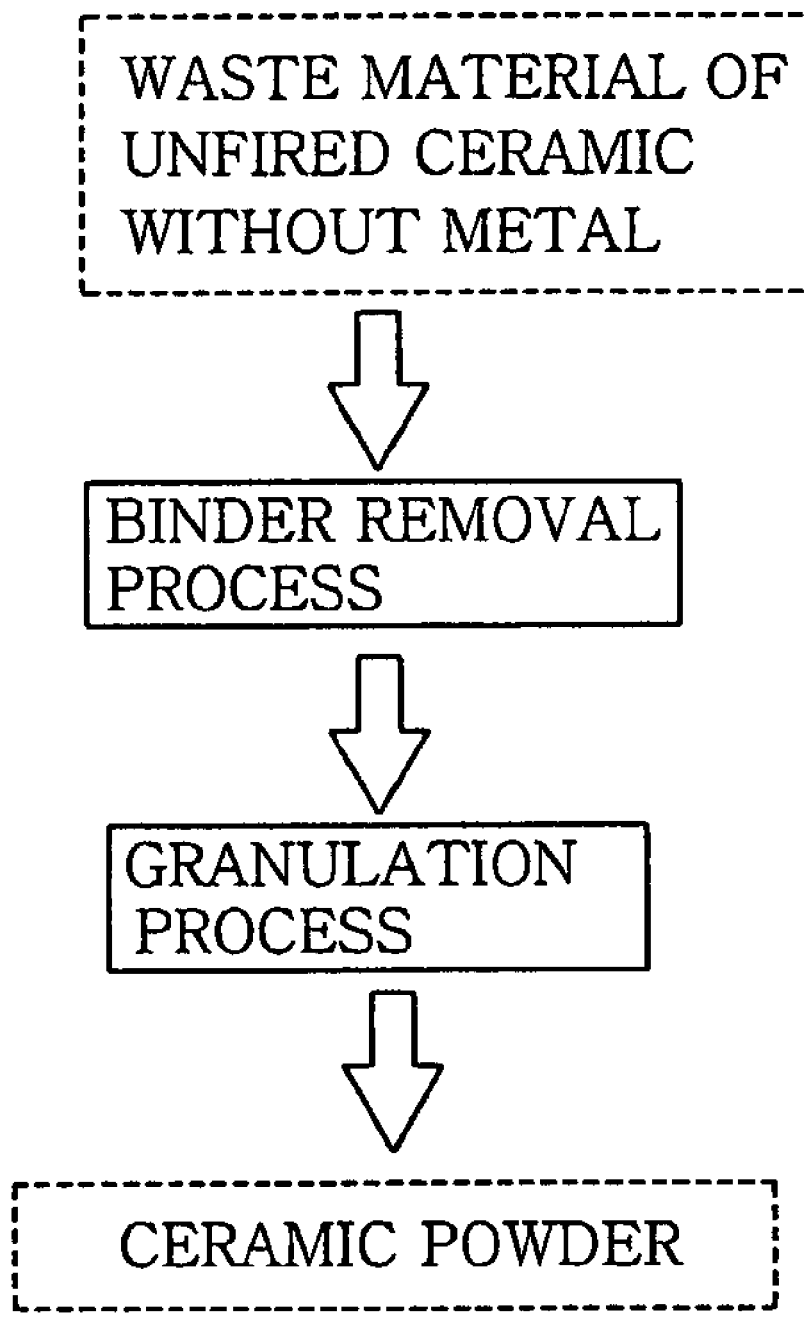
Figure 4:
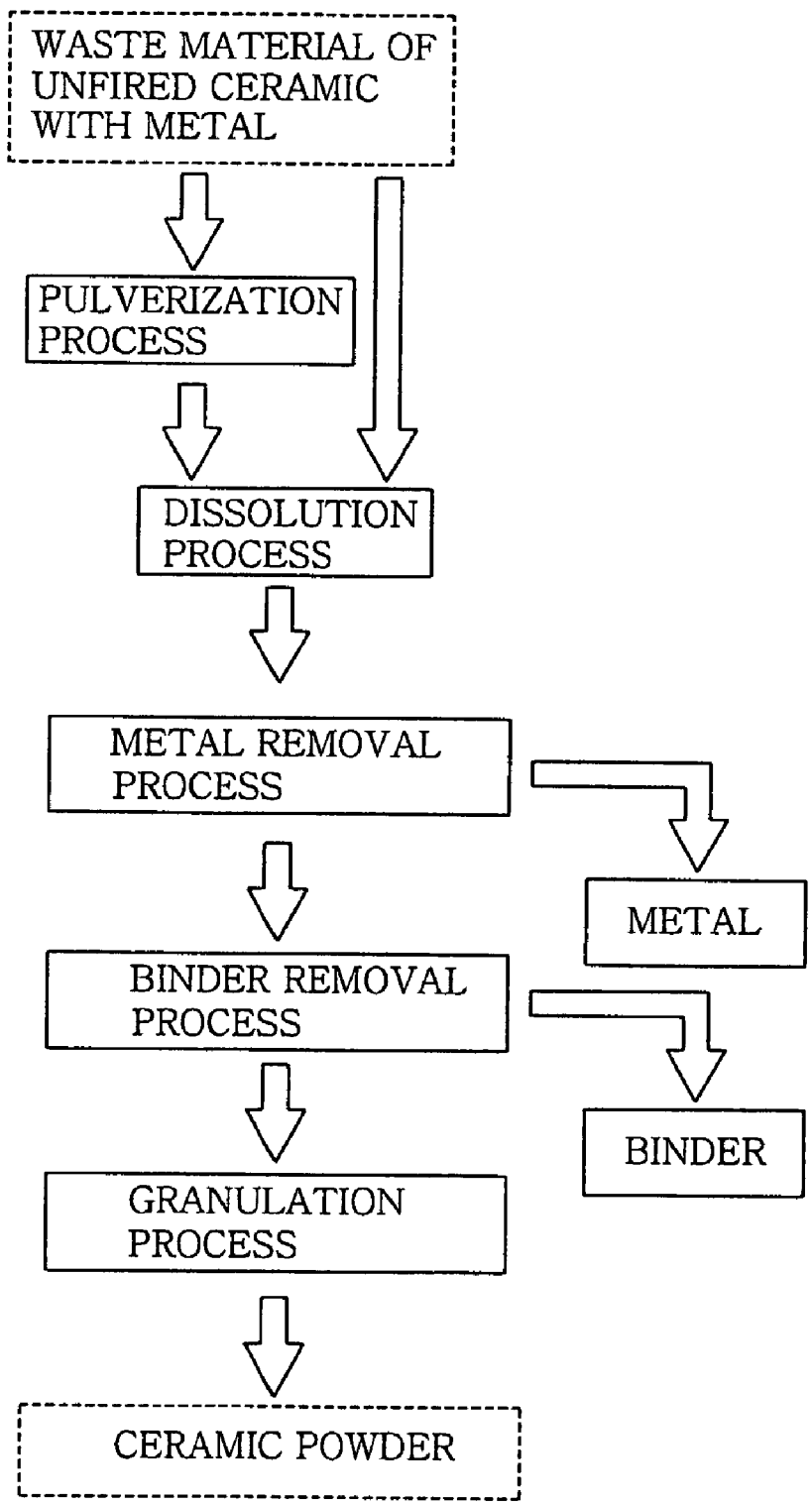
FIG. 4 is a flow diagram of a fifth inventive method of producing recycled ceramic powder from the waste material of unfired ceramic having metal.

FIGS. 1 to 4 respectively illustrate various methods or processes for recycling waste materials of unfired ceramic. In FIG. 1, recycled ceramic slurry is obtained from a waste material of unfired ceramic having no metal. In FIG. 2, the recycled ceramic slurry is obtained from the waste material of unfired ceramic including metal and the metal can be also recycled therefrom. In FIGS. 3A and 3B, a ceramic powder is obtained from the waste material of unfired ceramic having no metal and a binder can be also recycled therefrom. In FIG. 4, the ceramic powder is obtained from the waste material of unfired ceramic including metal, wherein both the metal and the binder can be also recycled therefrom.

Referring now to FIGS. 1 to 4, the above-mentioned recycling methods are respectively explained in more detail together with processing equipments used therefor.

Illustrated in FIG. 1 is a first inventive method of recycling unfired ceramic slurry in accordance with the present invention, wherein the waste material of unfired ceramic without metal is dissolved by means of a solvent in a preceding dissolution process.

The solvent used in the dissolution process is properly selected depending on which binder is included in the waste material of unfired ceramic. For example, water, an alcoholic solvent, or a mixture having at least two thereof is selected when the binder is polyvinyl alcohol. When the binder is polyvinylbutyral, the solvent is selected from an alcoholic solvent, an aromatic hydrocarbon solvent, a ketone solvent, an ester solvent, or a mixture having at least two thereof. When the binder is methylcellulose, the solvent is selected from water, an alcoholic solvent, a halogenated hydrocarbon solvent, an aromatic hydrocarbon solvent, a carboxylic acid solvent, or a mixture having at least two thereof. When the binder is carboxylmethyle cellulose, the solvent is selected from water, a hydrated organic solvent, or a mixture having at least two thereof. When the binder is ethylcellulose, the solvent is selected from an alcoholic solvent, an aromatic hydrocarbon solvent, a ketone solvent, an ester solvent, an alicyclic hydrocarbon solvent, or a mixture having at least two thereof. When the binder is hydroxypropylcellulose, the solvent is selected from water, a lower alcoholic solvent, or a mixture having at least two thereof. When the binder is acrylic one, the solvent is selected from water, an alcoholic solvent, an aromatic hydrocarbon solvent, a ketone solvent, an ester solvent, or a mixture having at least two thereof. When the binder is polyurethane-based one, the solvent is selected from water, an alcoholic solvent, an aromatic hydrocarbon solvent, a ketone solvent, an ester solvent, or a mixture having at least two thereof.

FIGS. 5A to 5D respectively show various equipments used in the dissolution process.

Figure 5A:
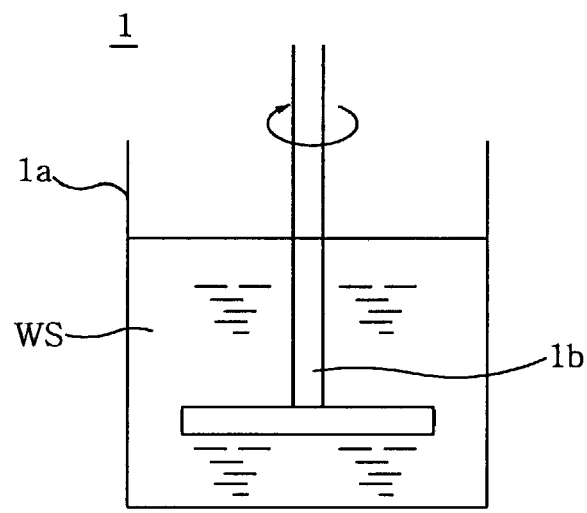
FIGS. 5A to 5D represent schematic views of equipments used in a dissolution process.

Shown in FIG. 5A is a stirring apparatus 1, which includes a vessel 1a and a stirrer 1b. The stirring apparatus 1 is suitable for dissolving a relatively soft material such as a waste green sheet. In the dissolution process for producing a waste solution "WS", the waste material of unfired ceramic is gradually injected into the vessel 1a containing a solvent while the stirrer 1b is rotating. Herein, a ceramic powder or a resin such as a binder in the waste solution "WS" preferably gives a solid concentration at above 50 wt % inclusive (% by weight) for a high viscosity of the waste solution "WS". The stirrer 1b preferably has a circumferential speed of above 10 m/s inclusive. Further, heating or cooling is properly applied to the waste solution "WS" so that the temperature thereof is preferably maintained around 40° C. Much higher temperature may volatilize the waste solution "WS"; much lower temperature may deteriorate the dissolution quality.

Figure 5B:
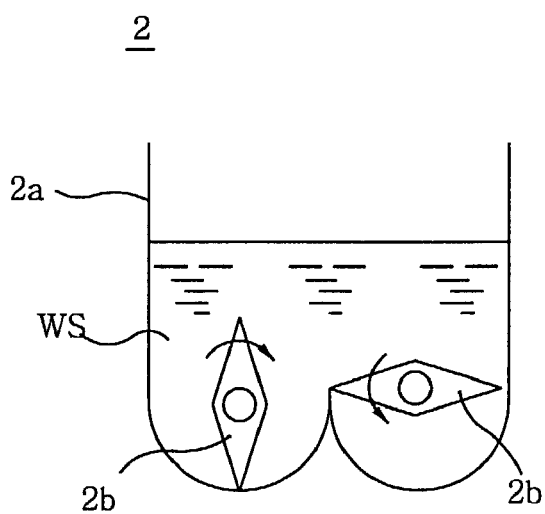

Shown in FIG. 5B is a kneading apparatus 2, which includes a vessel 2a and a kneader 2b. The kneading apparatus 2 is suitable for dissolving a relatively hard material such as a laminated sheet or an unfired ceramic chip. In the dissolution process, while the kneader 2b is rotating, the waste material of unfired ceramic is gradually injected into the vessel 2a containing a very small amount of a solvent, so that the waste material of unfired ceramic is kneaded into a clayey lump. The lump is further kneaded until a uniformly kneaded state thereof is reached. Then, the solvent is gradually applied thereto again while the lump is still being kneaded. After the viscosity of the lump is lowered below a certain level, the lump starts to be stirred. Since too low viscosity makes it difficult to sufficiently knead the waste solution "WS", the viscosity thereof is set as high as possible (within a maximum load of the kneading apparatus 2) at the start of the kneading process. Herein, when too much heat is generated in the kneading process, the lump may be conditionally cooled.

Figure 5C:
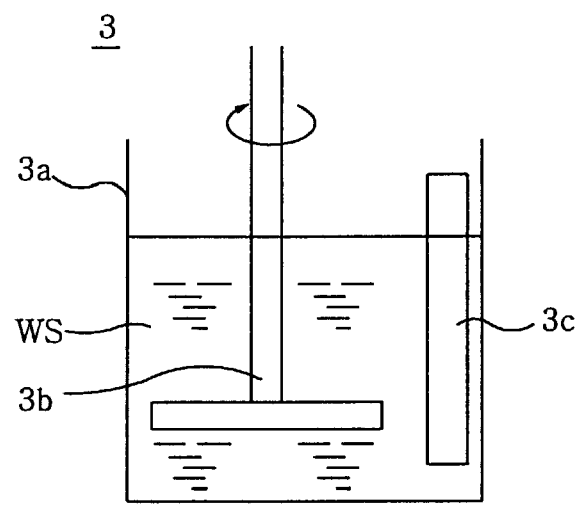

Shown in FIG. 5C is an ultrasonic dispersion apparatus 3, which includes a vessel 3a, an ultrasonic oscillator 3b, and a stirrer 3c. The ultrasonic dispersion apparatus 3 is suitable for dissolving a relatively soft material such as a waste green sheet. In the dissolution process for producing a waste solution "WS", the waste material of unfired ceramic is gradually injected into the vessel 3a containing a solvent while an electric level is applied to the ultrasonic oscillator 3b. The stirrer 3c is rotated to more effectively dissolve the waste material of unfired ceramic. Herein, a ceramic powder or a resin such as a binder in the waste solution "WS" preferably gives a solid concentration at above 50 wt % inclusive (% by weight) for a high viscosity of the waste solution "WS". The ultrasonic oscillator 3b may have a plurality of vibrators, each developing above 100 W inclusive, such that a total output thereof is preferably above 1000 W inclusive. Further, heating or cooling is properly applied to the waste solution "WS" such that the temperature thereof is preferably maintained around 40° C. Much higher temperature may volatilize the waste solution "WS"; much lower temperature may deteriorate the dissolution quality.

Figure 5D:
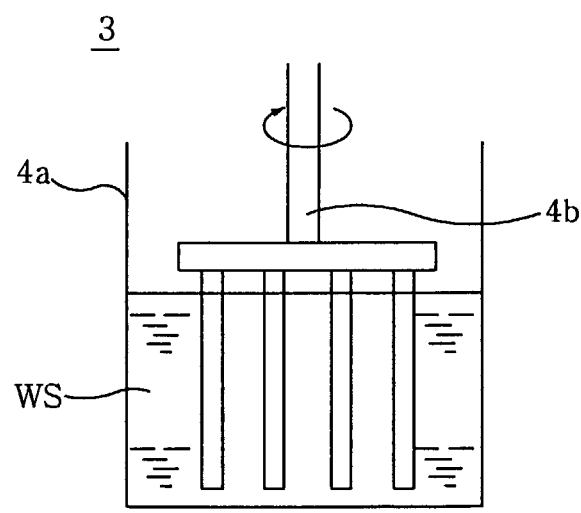

Shown in FIG. 5D is a media dispersion apparatus 4, which includes a vessel 4a and a disperser 4b. The media dispersion apparatus 4 is suitable for dissolving a relatively soft material such as pre-laminated sheets. In the dissolution process for producing a waste solution "WS", the waste material of unfired ceramic is gradually injected into the vessel 4a containing a solvent while the disperser 4b is rotating. Herein, a ceramic powder or a resin such as a binder in the waste solution "WS" preferably gives a solid concentration at above 50 wt % inclusive (% by weight) for a high viscosity of the waste solution "WS". Further, heating or cooling is properly applied to the waste solution "WS" such that the temperature thereof is preferably maintained around 40° C. Much higher temperature may volatilize the waste solution "WS"; much lower temperature may deteriorate the dissolution quality.

Figure 6:
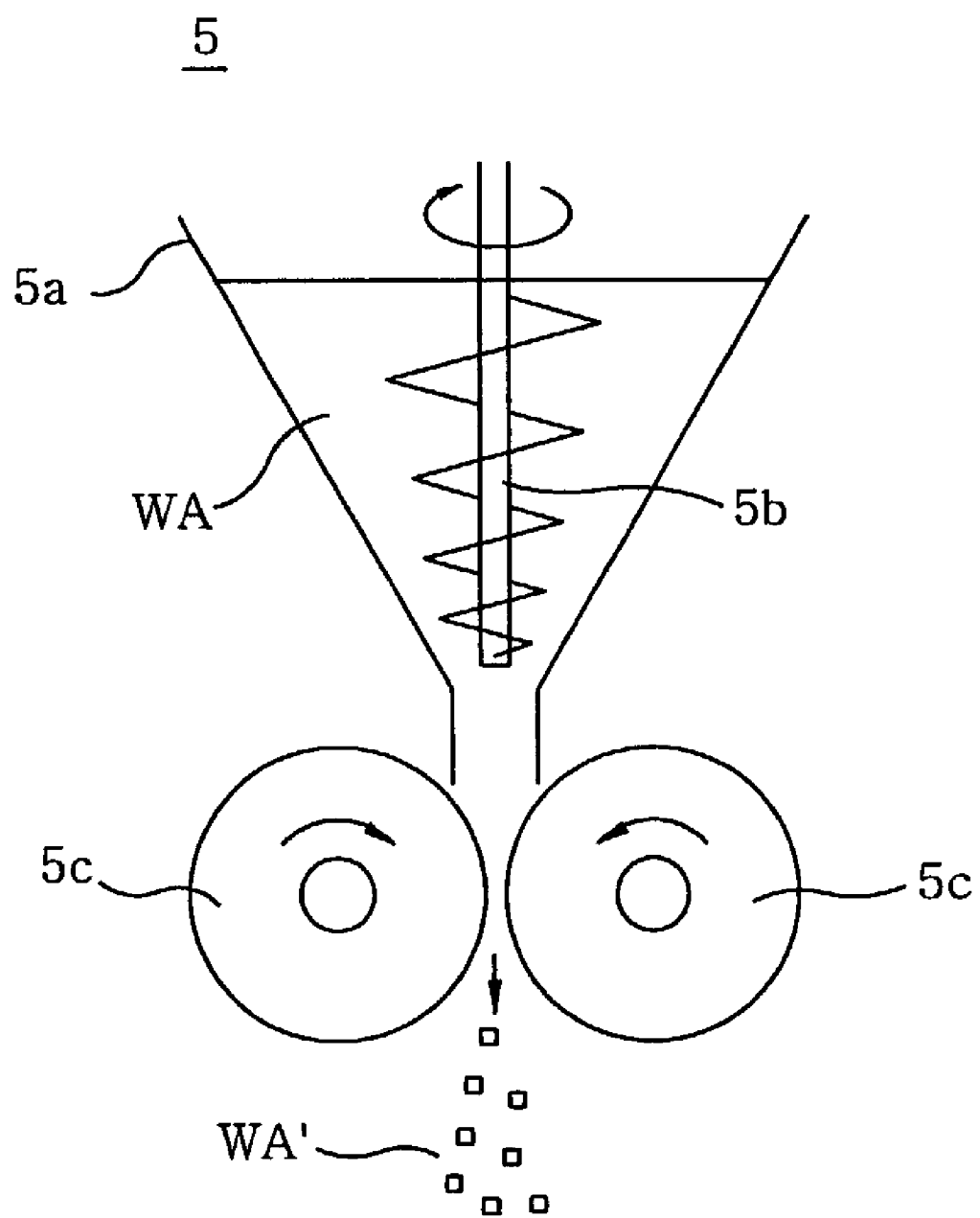
FIG. 6 is a schematic view of an equipment used in a pulverization process.

When the waste material of unfired ceramic to be recycled is a relatively hard one such as a laminated sheet scrap or an unfired ceramic chip scrap, a pulverization process selectively precedes the dissolution process. Shown in FIG. 6 is a pulverization apparatus 5 used for the pulverization process. The pulverization apparatus 5 includes a vessel 5a, a stirrer 5b, and a pair of pulverization rollers 5c. In the pulverization process, while the stirrer 5b and the pulverization roller 5c are rotating, the waste material of unfired ceramic "WA" is injected into the vessel 5a and pulverized into pieces "WA'" thereof.

Thereafter, the dissolution process for producing a waste solution and a composition adjustment process for adjusting the composition thereof are sequentially performed. Though ceramic particles, binders, a plasticizer, a dispersant, and a solvent are already included in the above-mentioned waste solution, the same kind plasticizer and dispersant or their similarities giving the same effect are added thereto in the composition adjustment process. The amount of the newly added additives in the waste solution is preferably limited below 1 wt %. Otherwise, a green sheet made from recycled ceramic slurry may have a deteriorated strength. In the composition adjustment process, the waste solution to be processed into the recycled ceramic slurry is examined by sampling to confirm that a solid concentration of a ceramic powder or a resin such as a binder therein is within a preferable range of about 45 to about 60 wt %.

Figure 7A:
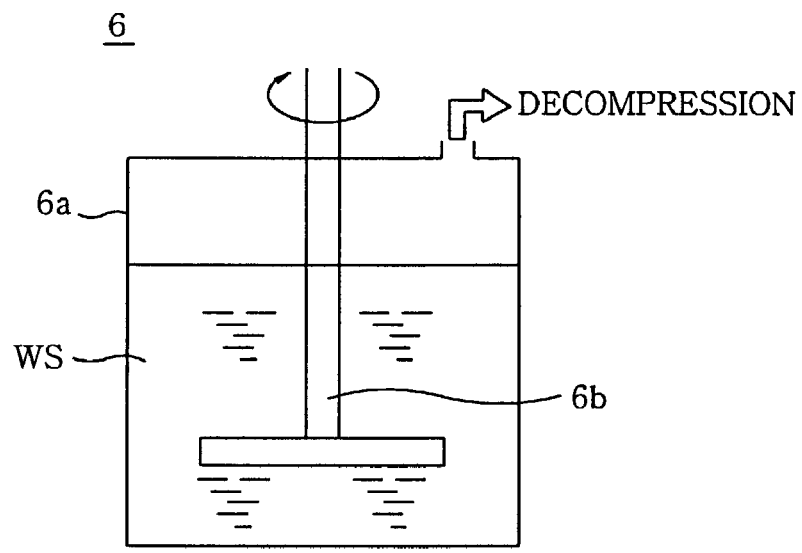
FIGS. 7A and 7B set forth schematic views of equipments used in a composition adjustment process.
Figure 7B:
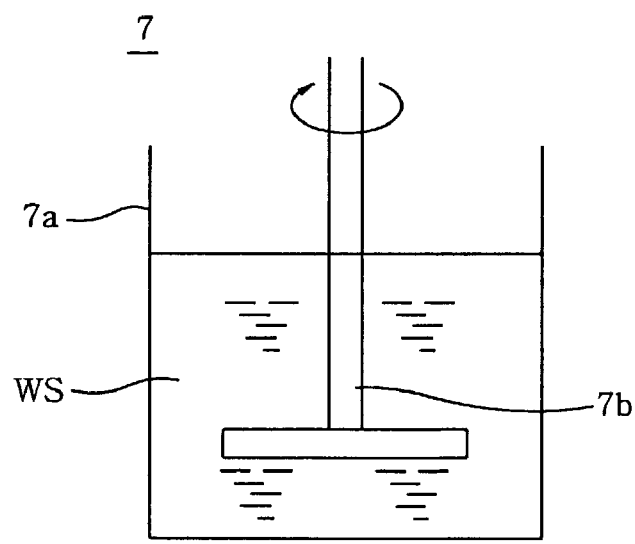

FIGS. 7A and 7B respectively show equipments used in the composition adjustment process.

Shown in FIG. 7A is a concentration apparatus 6, which includes a vessel 6a, a stirrer 6b, and a reducing pump (not shown). In the composition adjustment process, after the vessel 6a is decompressed, additives are injected into the vessel 6a while the stirrer 6b is rotated to stir a waste solution "WS" in the vessel 6a. Heating or cooling is properly applied to the waste solution "WS" such that the temperature thereof is preferably maintained around 40° C. Much higher temperature may volatilize the waste solution "WS".

Shown in FIG. 7B is a stirring apparatus 7, which includes a vessel 7a and a stirrer 7b. In the composition adjustment process, additives are injected into the vessel 7a while the stirrer 7b is rotated to stir a waste solution "WS" in the vessel 7a. Heating or cooling is properly applied to the waste solution "WS" such that the temperature thereof is preferably maintained around 40° C. Much higher temperature may volatilize the waste solution "WS".

By employing the above-explained methods, recycled ceramic slurry can be obtained from the waste material of unfired ceramic having no metal.

Such recycled ceramic slurry, same as primary ceramic slurry, can be used as a material of a ceramic electronic part. For example, the above-mentioned recycled ceramic slurry is coated on a stripe-shaped film so as to form a green sheet, which can be employed by a laminated ceramic capacitor of a simultaneous or a non-simultaneous firing type.

The simultaneous firing type laminated ceramic capacitor employing the above-mentioned green sheet is fabricated by applying a well known method including steps of: printing a conductive paste on the green sheet to form a first conductive layer used for an internal electrode pattern; boring the green sheet at an interval of a unit scale; laminating the bored green sheet together with other ones and then attaching them by applying pressure thereto so as to form a laminated sheet; slitting the laminated sheet into a plurality of unfired chips by means of a dicer or a slicer; removing a binder from each of the unfired chips; applying a conductive paste on each of the unfired chips to form a second conductive layer used for an external electrode; simultaneously firing each of the unfired chips and the first and the second conductive layer; and forming at least one plated layer on the external electrode. For fabricating a non-simultaneous firing type, after the binder is removed from each of the unfired chips, the unfired chips are fired together with the first conductive layer. Then, the conductive paste is applied on each of the chips fired to form the second conductive layer, which is subsequently fired to form the external electrode.

Illustrated in FIG. 2 is a second inventive method of recycling unfired ceramic slurry in accordance with the present invention, wherein the waste material of unfired ceramic with metal is dissolved to produce a waste solution by means of a solvent, as explained with reference to FIG. 1. Before the dissolution process, the waste material of unfired ceramic may be conditionally pulverized, as also explained in FIG. 1.

After the dissolution process, metal is removed from the waste solution. Though ceramic particles, binders, a plasticizer, a dispersant, and a solvent are already included in the above-mentioned waste solution, herein, the metallic particles are mainly separated and removed therefrom.

FIGS. 8A to 8E show equipments used in the metal removal process.

Figure 8A:
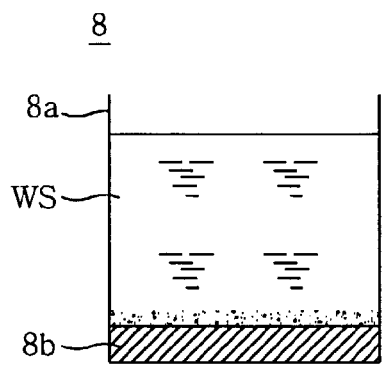
FIGS. 8A to 8E give schematic views of equipments used in a metal removal process.

Shown in FIG. 8A is a magnetic separation apparatus 8, which includes a vessel 8a and a magnet 8b and is suitable for separating a magnetic metal. In the metal removal process, after a waste solution "WS" is poured into the vessel 8a, the metallic particles therein are settled by the attraction of the magnet 8b. Then, after supernatant liquid is decanted for collection, the metallic particles together with other remaining components are also collected apart therefrom. Since it is better that the magnet 8b applies a wider magnetic field to the waste solution "WS", a plurality of unit magnets, each generating more than 5000 G, may be sequentially arranged therein in an alternate order of N-pole and S-pole.

The efficiency of the above-mentioned metal removal process is affected by a viscosity of the waste solution "WS". If the viscosity thereof is too low, the ceramic particles may also settle together with the metallic particles. Therefore, to prevent the settling of the ceramic particles, a solid concentration at about 30 to about 40 wt % both inclusive is preferably provided for the waste solution "WS" by a ceramic powder, a metallic powder, and a binder resin included therein.

Figure 8B:
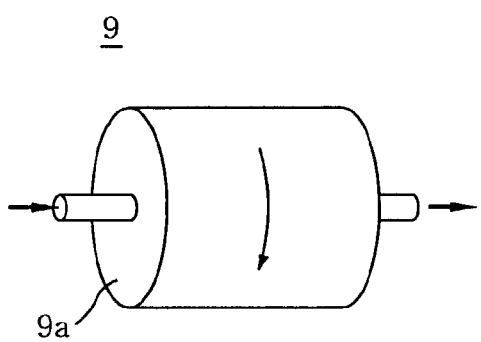

Shown in FIG. 8B is a centrifugal separation apparatus 9, which includes a rotating vessel 9a. In the metal removal process, a waste solution "WS" is poured into the rotating vessel 9a, which is then rotated for a certain time to perform the centrifugal separation where metallic particles are separated from ceramic particles because of a difference in their specific gravities. After the centrifugal separation, remaining liquid and a mixture including the metallic particles together with a small amount of other components are respectively collected.

The efficiency of the above-mentioned metal removal process is affected by a viscosity of the waste solution "WS" and a circumferential speed of the rotating vessel 9a. Since a too low viscosity or a too high circumferential speed makes the ceramic particles also separated, a solid concentration at about 40 wt % inclusive is preferably provided for the waste solution "WS" by a ceramic powder, a metallic powder, and a binder resin included therein and the centrifugal speed is preferably set to about 15 m/sec.

Figure 8C:
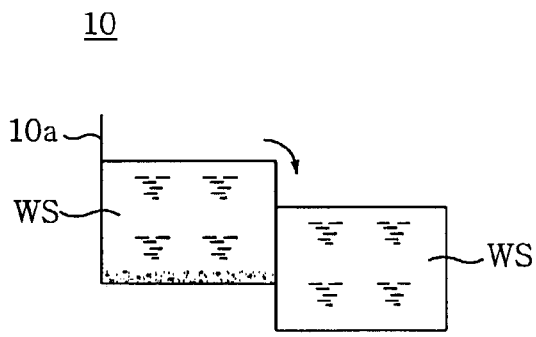

Shown in FIG. 8C is a precipitation apparatus 10, which includes a multi-staged vessel 10a. In the metal removal process, after a waste solution "WS" is poured into a first staged part of the vessel 10a, a portion of metallic particles settles because of a greater specific gravity than that of the ceramic particles. Then, supernatant liquid in the first staged part is poured into a second staged part of the vessel 10a such that another portion of the metallic particles can settle. After these steps are repeated for a predetermined number of repetitions, remaining liquid and a mixture including the metallic particles together with a small amount of other components are respectively collected.

The efficiency of the above-mentioned metal removal process is affected by a viscosity of the waste solution "WS". If the waste solution "WS" includes too much solution, the ceramic particles therein also settle together with the metallic particles. Therefore, to prevent the settling of the ceramic particles, a solid concentration at about 30 wt % inclusive is preferably provided for the waste solution "WS" by a ceramic powder, a metallic powder, and a binder resin included therein.

Figure 8D:
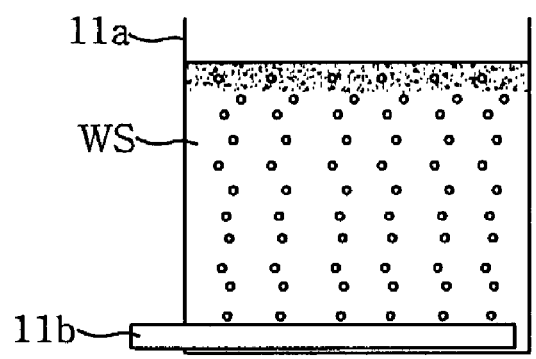

Shown in FIG. 8D is a bubbling apparatus 11, which includes a vessel 11a and a bubble generator 11b. In the metal removal process, a surfactant is added to a waste solution "WS" contained in the vessel 11a, so as to be adsorbed on metallic particles of the waste solution "WS". Then, the bubble generator 11b disposed at a bottom portion of the vessel 11a generates bubbles such that the bubbles are absorbed on the metallic particles. Since the bubbles provide buoyancy, the metallic particles absorbed with the bubbles can float to a top portion of the waste solution "WS". A mixture including the metallic particles together with a small amount of other components is then collected and remaining liquid is also collected apart therefrom.

If the waste solution "WS" is a solvent-based one, a non-ion surfactant may be used in the above-explained process; and a water-based one, an anion surfactant. Further, a bubble stabilizer such as a polyhydric alcohol of a fatty acid is preferably added such that the bubbles are maintained without being destructed. The bubble generator 11b preferably has a capacity of providing air at a flow rate of 1 L/min to intensely generate bubbles at a diameter of about 2 to about 5 mm. Furthermore, because a too low viscosity of the waste solution "WS" can make a readable settling of the metallic particles, a solid concentration at about 30 wt % inclusive is preferably provided for the waste solution "WS" by a ceramic powder, a metallic powder, and a binder resin included therein.

Figure 8E:
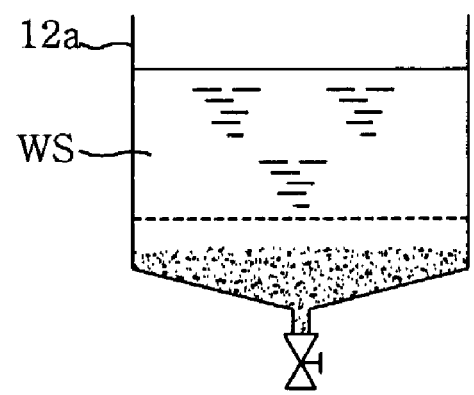

Shown in FIG. 8E is a settling separation apparatus 12, which includes a vessel 12a. In the metal removal process, an aqueous acid solution is added to a waste solution "WS" contained in the vessel 12a, thereby dissolving only metallic particles of the waste solution "WS". Then, after the waste solution "WS" is divided into a water phase portion and a solvent phase portion by means of settling, the solvent phase portion and remaining liquid are sequentially discharged so as to be collected in that order through a lower portion of the vessel 12a. Though a nitric acid is suitable for dissolving only the metallic particles, an acid density thereof is properly set such that ceramic particles are not dissolved.

After metal is removed from the waste solution "WS", a composition of the waste solution "WS" is adjusted. This composition adjustment process is already explained with reference to FIG. 1.

By employing the above-explained methods, recycled ceramic slurry can be obtained from the waste material of unfired ceramic having metal.

Such recycled ceramic slurry, same as primary ceramic slurry, can be used as a material of a ceramic electronic part. For example, the above-mentioned recycled ceramic slurry is coated on a stripe-shaped film so as to form a green sheet, which can be employed by a laminated ceramic capacitor of a simultaneous or a none-simultaneous firing type.

The simultaneous firing type laminated ceramic capacitor employing the above-mentioned green sheet is fabricated by applying a well known method including steps of: printing a conductive paste on the green sheet to form a first conductive layer used for an internal electrode pattern; boring the green sheet at an interval of a unit scale; laminating the bored green sheet together with other ones and then attaching them by applying pressure thereto so as to form a laminated sheet; slitting the laminated sheet into a plurality of unfired chips by means of a dicer or a slicer; removing a binder from each of the unfired chips; applying a conductive paste on each of the unfired chips to form a second conductive layer used for an external electrode; simultaneously firing each of the unfired chips and the first and the second conductive layer; and forming at least one plated layer on the external electrode. For fabricating a non-simultaneous firing type, after the binder is removed from each of the unfired chips, the unfired chips are fired together with the first conductive layer. Then, the conductive paste is applied on each of the chips fired to form the second conductive layer, which is subsequently fired to form the external electrode.

The metal or the metallic particles can be collected together with a small amount of other components via such a metal removal process. In that case, the mixture is diluted into a solution by applying the same solvent as used in the metal removal process, so that a solid concentration at about 30 wt % inclusive is preferably provided for the solution by a ceramic powder, a metallic powder, and a binder resin included therein. Then, the solvent is removed and a remaining mixture is dried such that the metallic particles can be collected as a recycled metallic powder, wherein a pulverization process may be conditionally applied to the metallic particles.

Such a recycled metallic powder, same as a primary one, can be used as a material of a ceramic electronic part. For example, the above-mentioned recycled metallic powder is used as a conductive paste in fabricating a laminated ceramic capacitor.

Illustrated in FIG. 3A is a third inventive method of recycling an unfired ceramic powder in accordance with the present invention, wherein the waste material of unfired ceramic without metal is dissolved to produce a waste solution by means of a solvent, as explained with reference to FIG. 1. Before the dissolution process, the waste material of unfired ceramic may be conditionally pulverized, as also explained in FIG. 1.

After the dissolution process, binders are removed from the waste solution. Though ceramic particles, binders, a plasticizer, a dispersant, and a solvent are already included in the above-mentioned waste solution, herein, the binders are mainly separated and removed therefrom.

Figure 9A:
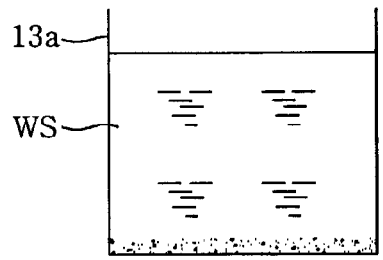
FIGS. 9A to 9C describe schematic views of equipments used in a binder removal process.
Figure 9B:
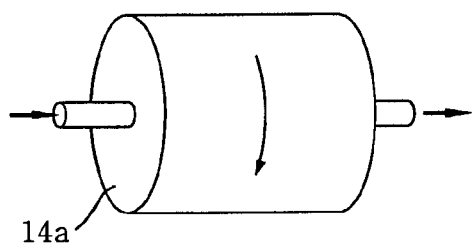
Figure 9C:
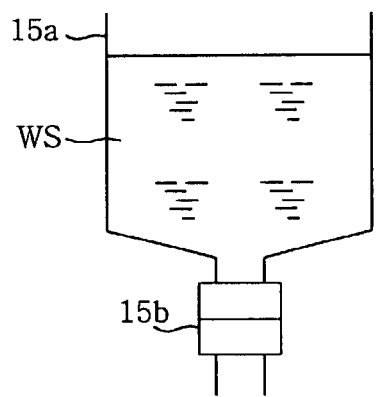

FIGS. 9A to 9C show equipments used in the binder removal process.

Shown in FIG. 9A is a precipitation apparatus 13, which includes a vessel 13a. In the binder removal process, a solvent is added to dilute a waste solution "WS" contained in the vessel 13a, so that a solid concentration at about 30 wt % inclusive is provided for the waste solution "WS" by a ceramic powder and a binder resin included therein. Then, after ceramic particles are allowed to settle, a remaining solution including the binder resin is decanted out of the vessel 13a such that the ceramic particles can be collected together with a small amount of other components.

Shown in FIG. 9B is a centrifugal separation apparatus 14, which includes a rotating vessel 14a. In the binder removal process, a waste solution "WS" is poured into the rotating vessel 14a, which is then rotated at a centrifugal speed of above 20 m/sec inclusive for more than 1 hour inclusive. After the centrifugal separation, remaining liquid including binders is discharged from the vessel 14a, so that the ceramic particles together with a small amount of other components can be collected.

Shown in FIG. 9C is a filtration apparatus 15, which includes a vessel 15a and a filter 15b. In the binder removal process, as a waste solution "WS" contained in the vessel 15a passes through the filter 15b, ceramic particles are captured on a threshold filtration film (not shown) of the filter 15b, so that the ceramic particles are collected while remaining liquid including binders is discharged out of the vessel 15b. Herein, the filtration film preferably has an effective threshold diameter of below 0.1 μm inclusive for a complete filtering of the ceramic particles.

After the binder removal process, a granulation process is applied to a mixture including the collected ceramic particles and a minute amount of other components.

FIGS. 10A to 10D show equipments used in the granulation process.

Figure 10A:
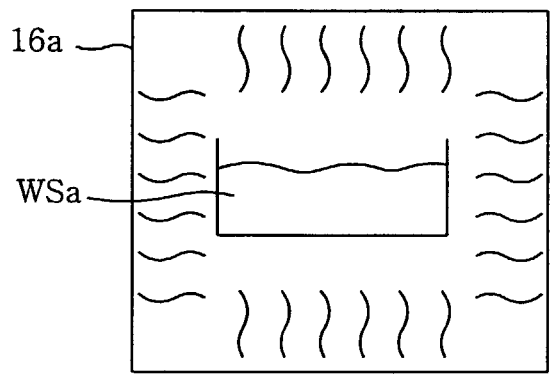
FIGS. 10A to 10D illustrate schematic views of equipments used in a granulation process.

Shown in FIG. 10A is a heating furnace 16 for heating and drying the collected mixture. Herein, a minute amount of other substances, such as the solvent or binder, may be previously attached to the ceramic particles in the mixture "WSa". To burn out the solvent or binder therein, by using the heating furnace 16, the mixture "WSa" is preheated above a thermal decomposition temperature of the solvent and the binder, i.e., at about 300 to about 600° C.

Figure 10B:
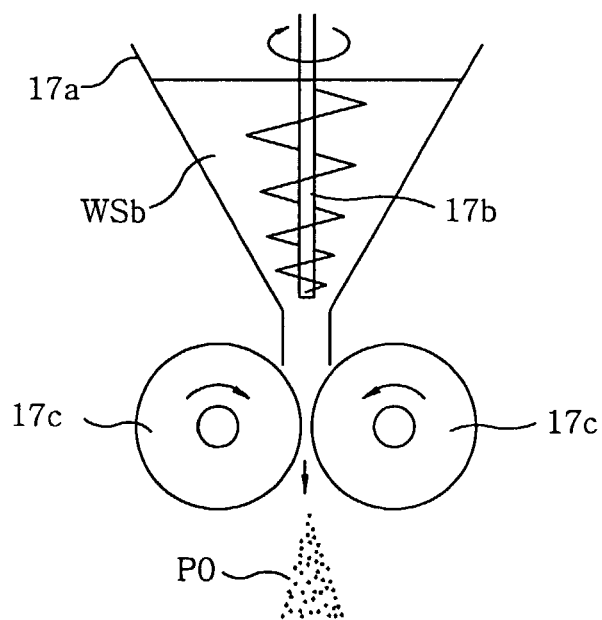

Shown in FIG. 10B is a pulverization apparatus 17, which includes a vessel 17a, a stirrer 17b, and a pair of pulverization rollers 17c. In the granulation process, dried ceramic particles "WSb" are poured into the vessel 17a while the stirrer 17b and the pair of pulverization rollers 17c are rotating, so that the ceramic particles "WSb" are pulverized into ceramic powders "PO".

Figure 10C:
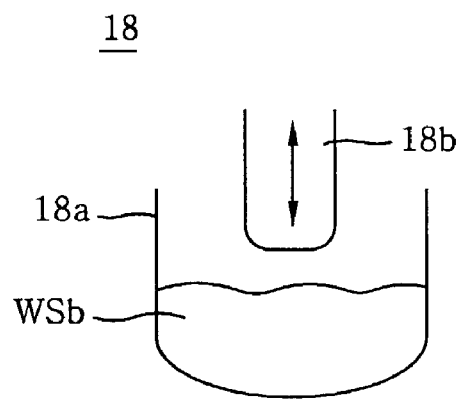

Shown in FIG. 10C is another pulverization apparatus 18, which includes a vessel 18a and a pounding pestle 18b. In the granulation process, after dried ceramic particles "WSb" are poured into the vessel 18a, the pounding pestle 18b repeatedly moves up and down to pulverize the ceramic particles "WSb" into ceramic powders.

Figure 10D:
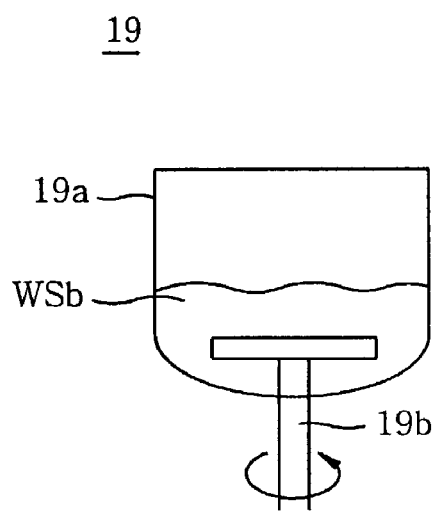

Shown in FIG. 10D is another pulverization apparatus 19, which includes a vessel 19a and a rotating grinder 19b. In the granulation process, after dried ceramic particles "WSb" are poured into the vessel 19a, the grinder 19b rotates to pulverize the ceramic particles "WSb" into ceramic powders.

By employing the above-explained methods, recycled ceramic powder can be obtained from the waste material of unfired ceramic without metal.

Such recycled ceramic powder, same as a primary one, can be used as a material of a ceramic electronic part. For example, the above-mentioned recycled ceramic powder is used to form ceramic slurry. The ceramic slurry is coated on a stripe-shaped film so as to form a green sheet, which can be employed by a laminated ceramic capacitor of a simultaneous or a none-simultaneous firing type.

The simultaneous firing type laminated ceramic capacitor employing the above-mentioned green sheet is fabricated by applying well known method steps as follows: printing a conductive paste on the green sheet to form a first conductive layer used for an internal electrode pattern; boring the green sheet at an interval of a unit scale; laminating the bored green sheet together with other ones and then attaching them by applying pressure thereto so as to form a laminated sheet; slitting the laminated sheet into a plurality of unfired chips by means of a dicer or a slicer; removing a binder from each of the unfired chips; applying a conductive paste on each of the unfired chips to form a second conductive layer used for an external electrode; simultaneously firing each of the unfired chips and the first and the second conductive layer; and forming at least one plated layer on the external electrode. For fabricating a non-simultaneous firing type, after the binder is removed from each of the unfired chips, the unfired chips are fired together with the first conductive layer. Then, the conductive paste is applied on each of the chips fired to form the second conductive layer, which is subsequently fired to form the external electrode.

The binders can be collected together with a small amount of other components after being melted in the preheating process. In that case, the mixture is dried and may be conditionally pulverized to obtain recycled binders. Such a recycled binder, same as a primary one, can be used as a material of a ceramic electronic part. For example, the above-mentioned recycled binder is used as a binder for a conductive paste in fabricating a laminated ceramic capacitor.

Illustrated in FIG. 3B is a fourth inventive method of recycling an unfired ceramic powder in accordance with the present invention, wherein binders are removed from the waste material of unfired ceramic without metal. Though ceramic particles, binders, a plasticizer, a dispersant, and a solvent are already included in the above-mentioned waste material of unfired ceramic, herein, the binders are mainly separated and removed therefrom.

Though not illustrated in FIG. 3B, when the waste material of unfired ceramic is heated above a thermal decomposition temperature of the binder, i.e., at about 300 to about 600° C., the binders are removed therefrom because of a thermal decomposition. Herein, the dispersant and the solvent are also burned out therefrom for the same reason.

After the binders are removed, the waste material of unfired ceramic is pulverized into powders, as explained with reference to FIG. 3A.

By employing the above-explained methods, recycled ceramic powder can be obtained from the waste material of unfired ceramic without metal.

Such recycled ceramic powder, same as a primary one, can be used as a material of a ceramic electronic part. For example, the above-mentioned recycled ceramic powder is used to form ceramic slurry. The ceramic slurry is coated on a stripe-shaped film so as to form a green sheet, which can be employed by a laminated ceramic capacitor of a simultaneous or a none-simultaneous firing type.

The simultaneous firing type laminated ceramic capacitor employing the above-mentioned green sheet is fabricated by applying a well known method including steps of: printing a conductive paste on the green sheet to form a first conductive layer used for an internal electrode pattern; boring the green sheet at an interval of a unit scale; laminating the bored green sheet together with other ones and then attaching them by applying pressure thereto so as to form a laminated sheet; slitting the laminated sheet into a plurality of unfired chips by means of a dicer or a slicer; removing a binder from each of the unfired chips; applying a conductive paste on each of the unfired chips to form a second conductive layer used for an external electrode; simultaneously firing each of the unfired chips and the first and the second conductive layer; and forming at least one plated layer on the external electrode. For fabricating a non-simultaneous firing type, after the binder is removed from each of the unfired chips, the unfired chips are fired together with the first conductive layer. Then, the conductive paste is applied on each of the chips fired to form the second conductive layer, which is subsequently fired to form the external electrode.

Illustrated in FIG. 4 is a fifth inventive method of recycling an unfired ceramic powder in accordance with the present invention, wherein the waste material of unfired ceramic with metal is dissolved to produce a waste solution by means of a solvent, as explained with reference to FIG. 1. Before the dissolution process, the waste material of unfired ceramic may be conditionally pulverized, as also explained in FIG. 1.

After the dissolution process, metal is removed from the waste solution. This metal removal process may be the same as explained with reference to FIG. 2.

After the metal removal process, binders are removed from the waste solution. This binder removal process may be the same as explained with reference to FIG. 3A. Alternatively, the waste solution may be dried into a dehydrated state and then heated above a thermal decomposition temperature of the binder, i.e., at about 300 to about 600° C., so that the binders are removed therefrom because of a thermal decomposition.

After the binders are removed, a collected mixture including the waste material of unfired ceramic is granulated into powders, as explained with reference to FIG. 3A.

By employing the above-explained methods, recycled ceramic powder can be obtained from the waste material of unfired ceramic having metal.

Such recycled ceramic powder, same as a primary one, can be used as a material of a ceramic electronic part. For example, the above-mentioned recycled ceramic powder is used to form ceramic slurry. The ceramic slurry is coated on a stripe-shaped film so as to form a green sheet, which can be employed by a laminated ceramic capacitor of a simultaneous or a none-simultaneous firing type.

The simultaneous firing type laminated ceramic capacitor employing the above-mentioned green sheet is fabricated by applying a well known method including steps of: printing a conductive paste on the green sheet to form a first conductive layer used for an internal electrode pattern; boring the green sheet at an interval of a unit scale; laminating the bored green sheet together with other ones and then attaching them by applying pressure thereto so as to form a laminated sheet; slitting the laminated sheet into a plurality of unfired chips by means of a dicer or a slicer; removing a binder from each of the unfired chips; applying a conductive paste on each of the unfired chips to form a second conductive layer used for an external electrode; simultaneously firing each of the unfired chips and the first and the second conductive layer; and forming at least one plated layer on the external electrode. For fabricating a non-simultaneous firing type, after the binder is removed from each of the unfired chips, the unfired chips are fired together with the first conductive layer. Then, the conductive paste is applied on each of the chips fired to form the second conductive layer, which is subsequently fired to form the external electrode.

The metal or the metallic particles can be collected together with a small amount of other components via such a metal removal process. In that case, the mixture is diluted into a solution by applying the same solvent as used in the metal removal process, so that a solid concentration at about 30 wt % inclusive is preferably provided for the solution. Then, the solvent is removed and a remaining mixture is dried such that the metallic particles can be collected as a recycled metallic powder, wherein a pulverization process may be conditionally applied to the metallic particles.

Such a recycled metallic powder, same as a primary one, can be used as a material of a ceramic electronic part. For example, the above-mentioned recycled metallic powder is used as a conductive paste in fabricating a laminated ceramic capacitor.

In addition, the binders can be collected together with a small amount of other components after being melted in the preheating process. In that case, the mixture is dried and may be conditionally pulverized to obtain recycled binders. Such a recycled binder, same as a primary one, can be used as a material of a ceramic electronic part. For example, the above-mentioned recycled binder is used as a binder for a conductive paste in fabricating a laminated ceramic capacitor.

By employing the above-explained methods, the waste material of unfired ceramic produced in the process for fabricating a laminated ceramic capacitor can be transformed into recycled ceramic slurry or recycled ceramic powder. Such a recycling method reduces the cost of fabricating a ceramic electronic part as well as disposing of the ceramic waste material.

Further, binders or metallic particles can be properly separated and collected from the waste solution by employing the recycling methods in accordance with the preferred embodiments of the present invention. The recycled binders or the recycled metallic particles are used same as primary ones. For this reason, the recycling methods in accordance with the preferred embodiments of the present invention more effectively reduce the cost of fabricating a ceramic electronic part as well as disposing of the ceramic waste material.

The recycling methods in accordance with the preferred embodiments of the present invention have been shown and described with respect to the process of fabricating the laminated ceramic capacitor. Applications thereof, however, are not limited to the laminated ceramic capacitor but may be adapted for other ceramic electronic parts, such as a laminated ceramic capacitor array, a laminated ceramic inductor, and a laminated ceramic LC filter. That is to say, the same or the similar process of fabricating the laminated ceramic capacitor may produce the waste material of unfired ceramic, which is then transformed into recycled ceramic slurry or recycled ceramic powder. Another recycled material such as a metallic powder or a binder can be also obtained by the recycling methods. These recycled materials, same as primary ones, are used to fabricate a ceramic electronic part.

While the invention has been shown and described with respect to the preferred embodiment, it will be understood to those skilled in the art that various changes and modifications may be made without departing from the spirit and scope of the invention as defined in the following claims.

What is claimed is:

1. A method for manufacturing a recycled unfired ceramic slurry comprising the steps of:
    dissolving the waste material of unfired ceramic in a solvent to form a waste solution which includes ceramic particles, binders, a plasticizer and a dispersant; and
    adjusting the composition of the waste solution to thereby produce the recycled unfired ceramic slurry by adding the same kinds of plasticizer and dispersant as those that are already dissolved in the waste solution to the waste solution so that a solid concentration thereof is within a range of about 45 to about 60 wt %,
    wherein all ceramic particles included in the recycled unfired ceramic slurry consist of the ceramic particles included in the waste solution.

2. The recycled unfired ceramic slurry produced by the method of claim 1.

3. The method of claim 1, wherein the waste material of unfired ceramic includes therein a metal component, and
    the method further comprising, prior to the step of adjusting the composition, the step of removing the metal component from the waste solution.

4. The recycled unfired ceramic slurry produced by the method of claim 3.

5. A method for fabricating a ceramic electronic part, comprising the steps of forming a green body by using an unfired ceramic slurry obtained by recycling the waste material of unfired ceramic and firing the green body, wherein the unfired ceramic slurry is produced by a method including the steps of:
    dissolving the waste material of unfired ceramic without containing therein a metal component in a solvent to form a waste solution which includes ceramic particles, binders, a plasticizer and a dispersant; and
    adjusting the composition of the waste solution to produce the unfired ceramic slurry by adding an additive to the waste solution so that a solid concentration thereof is within a range of about 45 to about 60 wt %,
    wherein the additive includes the same kinds of plasticizer and dispersant as those that are already dissolved in the waste solution and does not include new ceramic particles.

6. The ceramic electronic part fabricated by using the method of claim 5.

7. A method for fabricating a ceramic electronic part, comprising the steps of forming a green body by using an unfired ceramic slurry obtained by recycling the waste material of unfired ceramic and firing the green body, wherein the unfired ceramic slurry is produced by a method including the steps of:
    dissolving the waste material of unfired ceramic containing therein a metal component in a solvent to form a waste solution which includes ceramic particles, binders, a plasticizer and a dispersant;
    removing the metal component from the waste solution to provide a metal removed solution; and
    adjusting the composition of the metal removed solution to produce the unfired ceramic slurry by adding the same kinds of plasticizer and dispersant as those that are already dissolved in the waste solution to the waste solution so that a solid concentration thereof is within a range of about 45 to about 60 wt,
    wherein all ceramic particles included in the unfired ceramic slurry consist of the ceramic particles included in the waste solution.

8. The method of claim 3, wherein the step of removing the metal component is performed by using a magnetic separation method so that a magnet attracts the metal component.

9. The method of claim 3, wherein the step of removing the metal component is performed by using a centrifugal separation method so that the waste solution is rotated and then the metal component is separated from the ceramic particles.

10. The method of claim 3, wherein the step of removing the metal component is performed by using a precipitation separation method so that the metal component settles because of a greater specific gravity that of the ceramic particles.

11. The method of claim 3, wherein the step of removing the metal component includes the steps of:
    adding a surfactant to the waste solution such that the surfactant is adsorbed on the metal component; and
    generating bubbles such that the bubbles are adsorbed on the metal component.

12. The method of claim 3, wherein the step of removing the metal component includes the steps of:
    adding an aqueous acid solution to the waste solution, thereby dissolving only the metal component; and
    dividing the waste solution into a water phase portion and a solvent phase portion by means of settling.

* * * * *